United States Patent [19]

Rosthauser et al.

[11] Patent Number: 5,154,950

[45] Date of Patent: Oct. 13, 1992

[54] RAPID CURING, LIGHT STABLE, TWO-COMPONENT POLYURETHANE COATING COMPOSITIONS

[75] Inventors: James W. Rosthauser, Glen Dale; Edward P. Squiller, Wheeling, both of W. Va.; Peter H. Markusch, McMurray, Pa.

[73] Assignee: Miles Inc., Pittsburgh, Pa.

[21] Appl. No.: 447,331

[22] Filed: Dec. 7, 1989

[51] Int. Cl.$^5$ .............................................. B05D 3/10
[52] U.S. Cl. ..................... 427/340; 427/377; 427/385.5; 427/426
[58] Field of Search .................. 427/340, 385.5, 426, 427/377

[56] References Cited

U.S. PATENT DOCUMENTS

| | | | |
|---|---|---|---|
| 3,851,402 | 12/1974 | Turnbull et al. | 34/47 |
| 3,931,684 | 1/1976 | Turnbull et al. | 34/242 |
| 4,365,039 | 12/1982 | Blegen | 524/773 |
| 4,374,181 | 2/1983 | Blegen | 428/423.3 |
| 4,396,647 | 8/1983 | Linden | 427/340 |
| 4,546,153 | 10/1985 | Kamatani et al. | 525/453 |
| 4,631,206 | 12/1986 | Mabuschi et al. | 427/340 |
| 4,689,386 | 8/1987 | Chapman et al. | 427/385.5 |
| 4,788,083 | 11/1988 | Dammann et al. | 427/340 |

*Primary Examiner*—Janyce Bell
*Attorney, Agent, or Firm*—Joseph C. Gil; Thomas W. Roy

[57] ABSTRACT

The present invention is directed to a process for the preparation of a polyurethane coating by a) preparing a coating composition having an improved potlife from
    i) a compound containing at least two hydroxyl groups,
    ii) a polyisocyanate containing aliphatically-, cycloaliphatically- or araliphatically-bound isocyanate groups,
    iii) about 0.005 to 2.0 to weight percent, based on the weight of components i) and ii), of a tine catalyst and
    iv) at least about 50 mole percent, based on the tin catalyst, of hydrogen chloride,
b) applying the coating composition to a substrate and
c) curing the coating composition, optionally in the presence of an amine vapor, to form the polyurethane coating.

11 Claims, No Drawings

RAPID CURING, LIGHT STABLE, TWO-COMPONENT POLYURETHANE COATING COMPOSITIONS

BACKGROUND OF THE INVENTION

1. Field of the Invention

The present invention is directed to a process for the preparation of polyurethane coatings from two-component coating compositions which have a long potlife, but cure rapidly to form light stable polyurethane coatings.

2. Description of the Prior Art

It is difficult to provide coating compositions which have a long potlife and also cure rapidly to form the final coating. Generally, catalysts are added to the coating composition in order to accelerate the cure rate; however, the catalysts also shorten the potlife of the reaction mixture. One method which has been developed to overcome this difficulty is to cure the coating compositions in an amine vapor chamber. Because the amine catalyst is not present when the reaction components are initially mixed, the mixture has a long potlife. As the mixture passes through the chamber, the gaseous amine vapor catalyzes the reaction resulting in rapid cure. The preparation of coatings using the amine vapor chamber is disclosed in U.S. Pat. Nos. 4,396,647, 4,374,181 and 4,365,039.

One of the difficulties with this preparation procedure is that tertiary amines are only suitable for accelerating reactions between hydroxyl groups and aromatic isocyanate groups. They have relatively little affect on the reaction between hydroxyl groups and aliphatic, cycloaliphatic and araliphatic isocyanate groups. This latter reaction is generally catalyzed by tin compounds; however, since tin catalysts cannot be vaporized in the same manner as amine catalysts, the advantages of the amine vapor chamber cannot be obtained when using tin catalysts.

Accordingly, an object of the present invention is to provide an improved process for preparing polyurethane coatings from two-component compositions based on hydroxyl group-containing compounds and aliphatic, cycloaliphatic or araliphatic polyisocyanates which have a long potlife and yet cure rapidly. An additional object of the present invention is to provide a process for obtaining the benefits of the amine vapor chamber when using aliphatic, cycloaliphatic or araliphatic polyisocyanates instead of aromatic polyisocyanates. These objects may be achieved in accordance with the present invention as described hereinafter.

SUMMARY OF THE INVENTION

The present invention is directed to a process for the preparation of a polyurethane coating by
a) preparing a coating composition having an improved potlife from
  i) a compound containing at least two hydroxyl groups,
  ii) a polyisocyanate containing aliphatically-, cycloaliphatically- or araliphatically-bound isocyanate groups,
  iii) about 0.005 to 2.0 weight percent, based on the weight of components i) and ii), of a tin catalyst and
  iv) at least about 50 mole percent, based on the tin catalyst, of hydrogen chloride,
b) applying the coating composition to a substrate and
c) curing the coating composition, optionally in the presence of an amine vapor, to form the polyurethane coating.

DETAILED DESCRIPTION OF THE INVENTION

Polyisocyanates which are suitable for use in accordance with the present invention are those having aliphatically-, cycloaliphatically- or araliphatically-bound isocyanate groups. These polyisocyanates have an isocyanate content of about 1 to 50, preferably about 10 to 32 weight percent, based on the polyisocyanate, and contain an average of about 2 to 6, preferably about 2 to 4 isocyanate groups per molecule.

The polyisocyanates which are suitable for use as the polyisocyanate component may be monomeric polyisocyanates, polyisocyanate adducts or isocyanate-terminated prepolymers. The polyisocyanate adducts are generally prepared from monomeric polyisocyanates, preferably monomeric diisocyanates and contain biuret, allophanate, urea, urethane, carbodiimide or uretdione groups or isocyanurate rings. Suitable polyisocyanates which may be used as the monomeric polyisocyanates or for preparing the polyisocyanate adducts include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diiso-cyanate and mixtures of these isomers, 1-isocyanato-2-isocyanatomethyl cyclopentane, 1-isocyanato-3,3,5-trimethyl-5-isocyanatomethyl cyclohexane (isophorone diisocyanate or IPDI), 2,4- and 2,6-hexahydrotoluylene diisocyanate and mixtures of these isomers, 2,4'- and/or 4,4'-dicyclohexylmethane diisocyanate, $\alpha,\alpha\alpha',\alpha'$-tetramethyl-1,3- and/or -1,4-xylylene diisocyanate, 1,3- and/or 1,4-xylylene diisocyanate and 1-isocyanato-1-methyl-4(3)-isocyanato-methyl-cyclohexane.

Polyisocyanate adducts containing biuret groups may be prepared from the previously mentioned diisocyanates according to the processes disclosed in U.S. Pat. Nos. 3,124,605; 3,358,010; 3,644,490; 3,862,973; 3,903,126; 3,903,127; 4,051,165; 4,147,714 or 4,220,749 by using co-reactants such as water, tertiary alcohols, primary and secondary monoamines, and primary and/or secondary diamines. The preferred diisocyanate to be used in these processes is 1,6-diisocyanatohexane.

Polyisocyanate adducts containing allophanate groups may be prepared by reacting the previously mentioned diisocyanates according to the processes disclosed in U.S. Pat. Nos. 3,769,318 and 4,160,080, British Patent 994,890 and German Offenlegungsschrift 2,040,645.

Polyisocyanate adducts containing isocyanurate groups may be prepared by trimerizing the previously mentioned diisocyanates in accordance with the processes disclosed in U.S. Pat. Nos. 3,487,080; 3,919,218; 4,040,992; 4,288,586; and 4,324,879; German Auslegeschrift 1,150,080; German Offenlegungsschrift 2,325,826; and British Patent 1,465,812. The preferred diisocyanates to be used are 1,6-diisocyanatohexane, isophorone diisocyanate and mixtures of these diisocyanates.

Polyisocyanate adducts containing urea or preferably urethane groups and based on the reaction product of the previously mentioned diisocyanates and compounds having a molecular weight of less than 400 and containing 2 or more isocyanate-reactive hydrogens may be prepared according to the process disclosed in U.S. Pat. No. 3,183,112. When preparing polyisocyanate adducts using a large excess of diisocyanate, the average isocyanate functionality may be determined from the functionality of the compounds containing isocyanate-reactive hydrogens. For example, theoretically when an excess of a diisocyanate is reacted with a diol, a polyisocyanate with a functionality of approximately 2 will be produced, while a triol co-reactant will result in a polyisocyanate functionality of at least 3. By using mixtures of compounds containing isocyanate-reactive hydrogens, various functionalities can be obtained. The preferred isocyanate-reactive hydrogens are provided by hydroxyl groups, although other groups such as amino groups are not excluded. Suitable compounds containing isocyanate-reactive hydrogens are disclosed in U.S. Pat. No. 3,183,112, incorporated herein by reference, and include ethylene glycol, 1,2- and 1,3-propylene glycol, 1,3- and 1,4-butanediol, 1,6-hexanediol, 1,8-octanediol, neopentyl glycol, diethylene glycol, 2-methyl-1,3-propylene glycol, 2,2-dimethyl- 1,3-propylene glycol, the various isomeric bis-hydroxymethyl cyclohexanes, 2,2,4-trimethyl-1,3-pentanediol, glycerine, trimethylol propane, ethylene diamine, diethylene triamine, triethylene tetraamine, 1,6-hexanediamine, piperazine, 2,5-dimethyl piperazine, 1-amino-3-aminomethyl-3,5,5- trimethylcyclohexane, bis(4-aminocyclohexyl)methane, bis(4-amino-3-methylcyclohexyl)methane, 1,4-cyclohexanediamine, 1,2-propanediamine, hydrazine, aminoacid hydrazides, hydrazides of semicarbazido carboxylic acids, bis-hydrazides and bis-semicarbazides. 1,3- and 1,4-butanediol, 2,2,4-trimethyl-1,3-pentanediol, trimethylol propane and mixtures thereof are particularly preferred. It is also possible to use any of the previously described polyisocyanate adducts for the further preparation of polyisocyanate adducts containing urethane or urea groups. Preferred diisocyanates are 1,6-hexamethylene diisocyanate, isophorone diisocyanate and mixtures of these diisocyanates.

In addition to using the previously described monomeric polyisocyanates or polyisocyanate adducts for preparing the polyisocyanate component of the present invention, it is also suitable to prepare the polyisocyanate component from isocyanate-terminated prepolymers. These prepolymers are formed by reacting an excess of the previously described polyisocyanates, preferably monomeric diisocyanates, with high molecular weight isocyanate-reactive compounds and optionally low molecular weight isocyanate-reactive compounds. Prepolymers prepared exclusively from polyisocyanates and low molecular weight isocyanate-reactive compounds are referred to as polyisocyanate adducts containing urea and/or urethane groups and have previously been discussed. A sufficient excess of the polyisocyanate should be used to ensure that the prepolymers are terminated with isocyanate groups.

It should also be ensured that the isocyanate-terminated prepolymers remain soluble in the commonly used polyurethane solvents and do not gel. Gelation may result when sufficiently cross-linked, isocyanate-terminated prepolymers are prepared from polyisocyanates or isocyanate-reactive compounds containing more than two reactive groups. Minimal amounts of branching do not lead to gelation; however, once a sufficient cross-link density is achieved, gelation occurs. The critical cross-link density, commonly referred to as the gel point, may be calculated by known methods or readily determined by simply reacting the desired components and observing whether gel particles form. In order to avoid gelation, it is preferred to prepare the isocyanate-terminated prepolymers from monomeric diisocyanates rather than from higher functional polyisocyanates. It is additionally preferred to prepare the isocyanate-terminated prepolymers from high molecular weight isocyanate-reactive compounds which do not contain excessive amounts of branching in order to further reduce the possibility that gelation will occur. Finally, it is preferred to prepare the isocyanate-terminated prepolymers by adding the isocyanate-reactive compound to the polyisocyanate since this helps to maintain an excess of isocyanate groups throughout the formation of the prepolymer.

The high molecular weight compounds to be used with the previously described polyisocyanates for preparing the isocyanate-terminated prepolymers are selected from the known compounds containing isocyanate-reactive groups, preferably hydroxyl groups, which are at least difunctional in the sense of the isocyanate-addition reaction. These compounds generally have an average functionality of about 2 to 8, preferably 2 to 4. The compounds containing at least two isocyanate-reactive hydrogen atoms generally have a molecular weight ($M_n$) of 400 to about 10,000, preferably 400 to about 8,000, as determined from the OH number.

Examples of high molecular weight compounds include:

1) Polyhydroxyl polyesters which are obtained from polyhydric, preferably dihydric alcohols to which trihydric alcohols may be added, and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be saturated and/or substituted, e.g. by halogen atoms. Examples of these acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid (which may be mixed with monomeric fatty acids), dimethyl terephthalate and bis-glycol terephthalate. Suitable polyhydric alcohols include the polyhydric alcohols previously set forth for preparing the polyisocyanate adducts containing urea or urethane groups.

2) Polylactones generally known from polyurethane chemistry, e.g., polymers obtained by the ring-opening polymerization of ε-caprolactone initiated with the above-mentioned polyhydric alcohols.

3) Polycarbonates containing hydroxyl groups such as the products obtained from the reaction of the polyhydric alcohols previously set forth for preparing the polyisocyanate adducts containing urea or urethane groups, preferably dihydric alcohols such as 1,3-propanediol, 1,4-butanediol, 1,4-dimethylol cyclohexane, 1,6-hexanediol, diethylene glycol, triethylene glycol or tetraethylene glycol with phosgene, diaryl carbonates such as diphenyl carbonate or cyclic carbonates such as ethylene or propylene carbonate. Also suitable are polyester carbonates obtained from the reaction of lower molecular weight oligomers of the above-mentioned polyesters or polylactones with phosgene, diaryl carbonates or cyclic carbonates.

4) Polyethers include the polymers obtained by the reaction of starting compounds which contain reactive hydrogen atoms with alkylene oxides such as propylene oxide, butylene oxide, styrene oxide, tetrahydrofuran, epichlorohydrin or mixtures of these alkylene oxides. Suitable starting compounds containing at least one reactive hydrogen atom include the polyols set forth as suitable for preparing the polyisocyanate adducts containing urethane or urea groups and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone and 1,1,1- or 1,1,2-tris(hydroxylphenyl)ethane. Polyethers which have been obtained by the reaction of starting compounds containing amino groups can also be used, but are less preferred for use in the present invention. Suitable amine starting compounds include those set forth as suitable for preparing the polyisocyanate adducts containing urethane or urea groups and also ammonia, methylamine, tetramethylenediamine, ethanolamine, diethanolamine, triethanolamine, aniline, phenylenediamine, 2,4- and 2,6-toluylenediamine, polyphenylene polymethylene polyamines of the kind obtained by the aniline/formaldehyde condensation reaction and mixtures thereof. Resinous materials such as phenol and cresol resins may also be used as the starting materials. The preferred starting compounds for the polyethers are those compounds which exclusively contain hydroxyl groups, while compounds containing tertiary amine groups are less preferred and compounds containing isocyanate-reactive-NH groups are much less preferred.

Polyethers modified by vinyl polymers are also suitable for the process according to the invention. Products of this kind may be obtained by polymerizing, e.g., styrene and acrylonitrile in the presence of polyethers (U.S. Pat. Nos. 3,383,351; 3,304,273; 3,523,095; and 3,110,695; and German Patent No. 1,152,536). Also suitable as polyethers, although less preferred, are amino polyethers, e.g., wherein at least a portion of the hydroxyl groups of the previously described polyethers are converted to amino groups.

5) Polythioethers such as the condensation products obtained from thiodiglycol on its own and/or with other glycols, dicarboxylic acids, formaldehyde, amino carboxylic acids or amino alcohols. The products are either polythio mixed ethers, polythio ether esters, or polythioether ester amides, depending on the co-components.

6) Polyacetals including those obtained from the above-mentioned polyhydric alcohols, especially diethylene glycol, triethylene glycol, 4,4'-dioxyethoxy-diphenyl-dimethylene, 1,6-hexanediol and formaldehyde. Polyacetals suitable for use in the invention may also be prepared by the polymerization of cyclic acetals.

7) Polyether esters containing isocyanate-reactive groups which are known in the art.

8) Polyester amides and polyamides including the predominantly linear condensates obtained from polyvalent saturated and unsaturated carboxylic acids or their anhydrides and polyvalent saturated and unsaturated amino alcohols, diamines, polyamines, or mixtures thereof.

9) The polyhydroxy polyacrylates generally have a molecular weight, as determined by vapor pressure osmometry of 232 to about 100,000, preferably about 1000 to 80,000, more preferably about 2000 to 50,000, and a hydroxyl group content of about 0.017 to 15% by weight, preferably about 0.1 to 10% by weight and more preferably about 0.5 to 5% by weight. The polyhydroxy polyacrylates preferably have at least two alcoholic hydroxyl groups per molecule as a statistical average although in principle it would be possible to use the corresponding monohydroxyl compounds. The average functionality of the polyhydroxy polyacrylates may be as high as 15. The molecular weights indicated for the polyacrylates containing hydroxyl groups are number average molecular weights and not weight average molecular weights which may be determined by light scattering. These polyhydroxy polyacrylates are known and may be prepared by known methods such as those described in European Patent Office Publication 68,383, German Patentschrift 2,460,329, British Patent 1,515,868, U.S. Pat. Nos. 3,002,959, 3,375,227 or German Auslegeschrift 1,038,754. The polyhydroxy polyacrylates are generally prepared by the radical polymerization or copolymerization of a hydroxyalkyl ester of an unsaturated carboxylic acid, preferably acrylic or methacrylic acid, with itself or preferably together other hydroxyl-free unsaturated monomers.

Suitable hydroxylalkyl esters include esters containing 2 to 8, preferably 2 to 4 carbon atoms in the alkyl group and obtained from $\beta,\alpha$-unsaturated carboxylic acids having 3 to 5 carbon atoms, such as acrylic, methacrylic, fumaric, maleic, itaconic or crotonic acid. The acrylic and methacrylic acid esters are preferred. Hydroxyalkyl esters of the above-mentioned acids containing ether bridges in the alkyl groups may also be used but are less preferred. The particularly preferred monomers with alcoholic hydroxyl groups include the 2-hydroxyethyl-, 2- and 3-hydroxypropyl-, and 2-, 3- and 4-hydroxybutylacrylates and -methacrylates. These monomers containing alcoholic hydroxyl groups may be prepared, for example, by the reaction of the above-mentioned acids with epoxides such as alkylene or propylene oxide.

Also suitable are hydroxyalkyl esters prepared by the addition of at least one mole of $\epsilon$-caprolactone to the hydroxyalkyl esters described above.

The polyhydroxy polyacrylates which are used may also be prepared by reacting the corresponding polyacrylates containing carboxylic acid groups with alkylene oxides such as propylene oxide and/or ethylene oxide in the presence of suitable alkoxylation catalysts such as tetrabutylammonium bromide. The starting materials for this alkoxylation reaction, i.e., the polyacrylates containing carboxylic acid groups, are obtained in known manner by the copolymerization of unsaturated carboxylic acids such as acrylic acid and/or methacrylic acid with unsaturated comonomers which do not contain carboxyl or hydroxyl groups. The preferred method for preparing the polyhydroxy polyacrylates is the copolymerization of the hydroxyalkyl esters of unsaturated carboxylic acids previously set forth.

The comonomers used for the above-mentioned hydroxyl group-containing monomers may be any $\alpha,\beta$-olefinically unsaturated compounds in the molecular weight range of 28 to 350 which are free from hydroxyl groups such as ethylene, propylene, butene-1, hexene-1, octene-1, styrene, $\alpha$-methylstyrene, divinyl benzene, various isomeric vinyl toluenes, esters of $\alpha,\beta$-unsaturated carboxylic acids of the type exemplified above with monohydric aliphatic alcohols having 1 to 18, preferably 1 to 10 carbon atoms, in particular the corresponding esters of acrylic or methacrylic acids such as the methyl, ethyl, N-butyl, N-pentyl, N-hexyl, 2-ethylhexyl or octadecyl esters of acrylic or methacrylic acid.

Neutral esters of polycarboxylic acids are also suitable comonomers, for example, itaconic, crotonic, maleic or fumaric esters of the monohydric alcohols exemplified above.

Acrylic acid, methacrylic acid, vinyl acetate, acrylonitrile, methacrylonitrile and dienes such as isoprene or or butadiene are all suitable comonomers. Vinyl chloride may in principle also be used as a comonomer.

Particularly preferred polyhydroxy polyacrylates are obtained from about 10 to 50 parts by weight of hydroxyalkyl esters of acrylic or methacrylic acid, 0 to 80 parts by weight of styrene and/or α-methylstyrene, about 10 to 90 parts by weight of an acrylic and/or methacrylic acid ester free from hydroxyl group of the type exemplified above and 0 to about 5 parts by weight of an $\alpha,\beta$-unsaturated mono- or dicarboxylic acid of the type exemplified, in particular acrylic acid or methacrylic acid.

The preferred high molecular weight isocyanate-reactive compounds for use in the process according to the invention are the polyhydroxyl polyethers, polyesters, polylactones, polycarbonates, polyester carbonates and especially polyacrylates.

In addition to the high molecular weight compounds, the isocyanate-terminated prepolymers may also optionally be prepared from low molecular weight isocyanate-reactive compounds having an average molecular weight of up to 400. The low molecular weight isocyanate-reactive compounds should have an average functionality of about 2 to 8, preferably from about 2 to 6 and most preferably from about 2 to 4, and may also contain ether, thioether, ester, urethane and/or urea bonds.

Examples of low molecular weight compounds include the polyamines and diols or triols used as chain lengthening agents or cross-linking agents in polyurethane chemistry such as those listed as suitable for preparing the polyisocyanate adducts containing urethane or urea groups and the polyester and polyether polyols. Additional examples include those set forth in U.S. Pat. Nos. 4,439,593 and 4,518,522, both of which are herein incorporated by reference in their entirety.

A solvent or solvent mixture may be used during the production of the polyisocyanate adducts or isocyanate-terminated prepolymers. When a solvent is employed, the solvent or solvent mixture preferably remains in the composition until it is used. However, it is of course also possible to use a solvent simply to promote thorough mixing of the compounds used for preparing the polyisocyanates and subsequently to distill off this solvent (in vacuo) leaving a ready-to-use mixture in solvent-free form which may be redissolved in solvents at any later stage.

Suitable solvents include the known polyurethane solvents, for example, toluene, xylene, butyl acetate, ethylacetate, ethylene glycol monoethyl ether acetate (EGA), ethylene glycol monomethyl ether acetate, ethylene glycol monobutyl ether acetate, diethylene glycol monoethyl ether acetate, diethylene glycol monomethyl ether acetate, diethylene glycol monobutyl ether acetate, propylene glycol monomethyl ether acetate, methyl ethyl ketone or methyl isobutyl ketone, hydrocarbon solvents such as hexane and heptane, aromatic solvents and also mixtures of the above solvents.

In the compositions prepared according to the present invention, the use of solvents is not always necessary; the solvent is used primarily to reduce the viscosity of the compositions to a workable range. Generally the solids content of the composition is greater than 20% and may be as high as 100%.

The isocyanate-reactive component to be used in combination with the polyisocyanate component in accordance with the present invention is selected from the high and low molecular weight polyols previously described as suitable for the preparation of the isocyanate-terminated prepolymers. The isocyanate-reactive component may also be based on mixtures of these polyols. Generally, at least a portion of the isocyanate-reactive component is selected from high molecular weight polyols when the polyisocyanate component is based on monomeric polyisocyanates or polyisocyanate adducts in order for the two-component composition to have a resinous character. When isocyanate-terminated prepolymers are used as the polyisocyanate component, then it is sufficient to use low molecular weight polyols as the isocyanate-reactive component. However, high molecular weight polyols may also be used either alone or in admixture with the low molecular weight polyols in this embodiment. The high molecular weight polyols may have a functionality higher than that previously described for prepolymer formation, i.e., up to 15.

Suitable tin catalysts which may be used in accordance with the present invention include tin (II) salts of carboxylic acids such as tin (II) acetate, tin (II) octoate. tin (II) ethyl hexanoate and tin (II) laurate, and tin (IV) compounds such as dibutyl tin oxide, dibutyl tin dichloride, dimethyl tin dichloride, dibutyl tin diacetate, dimethyl tin diacetate, dibutyl tin dilaurate, dimethyl tin dilaurate, dibutyl tin maleate, dimethyl tin maleate, dioctyl tin diacetate, dioctyl tin dilaurate, dibutyl tin dilauryl mercaptide and dimethyl tin dilauryl mercaptide. It is also possible to use mixtures of these catalysts. The tin catalysts may be added to either the polyisocyanate component or the isocyanate-reactive component, but they are preferably added to the isocyanate-reactive component. The amount of tin catalyst which is to be added in accordance with the present invention is about 0.005 to 2.0 weight percent, preferably about 0.02 to 0.5 weight percent, based on combined weight of the polyisocyanate and isocyanate-reactive components.

In accordance with the present invention, hydrogen chloride is added to the coating composition before it is cured, optionally in the amine vapor chamber. If the tin catalyst is added to the polyisocyanate component, then hydrogen chloride should be added to this component. However, if the tin catalyst is added to the isocyanate-reactive component, which is preferred, hydrogen chloride may be added to either the isocyanate-reactive component or preferably the polyisocyanate component. The hydrogen chloride should be added in an amount of at least about 50 mole percent, preferably about 50 to 1000 mole percent, more preferably about 100 to 1000 mole percent and most preferably about 100 to 500 mole percent, based on the moles of tin catalyst present. Hydrogen chloride is preferably added to the desired component in anhydrous form, preferably as a vapor, in order to avoid the presence of water which is known to react with polyisocyanates to form insoluble ureas which are detrimental to polyurethane coating compositions.

The polyisocyanate component, isocyanate-reactive component, tin catalyst and hydrogen chloride are blended together and then cured, optionally in an amine vapor chamber, in known manner. Because of the presence of the tin catalyst and hydrogen chloride in the coating composition, the composition possesses a long potlife and yet also cures rapidly, especially in the presence of the amine vapor. The coating composition may also be applied using known spray apparatus wherein the two reactive components are maintained in separate containers, mixed in a mixhead and sprayed onto a substrate. The tin catalyst and hydrogen chloride are blended with the reactive components as previously discussed. If desired, the amine catalyst may be introduced by the vapor injection process wherein the amine catalyst is also drawn into the mixhead from a third container.

Suitable amine catalysts for use in accordance with the present invention include aliphatic and aromatic tertiary amines. Examples of aliphatic amine include trimethylamine, triethylamine, tripropylamine, tributylamine, dimethylcyclohexylamine, dibutylcyclohexylamine, dimethylethanolamine, triethanolamine, diethylethanolamine, ethyldiethanolamine, dimethylisopropanolamine, triisopropanolamine, N,N,N',N'-tetramethyl-ethylenediamine, N,N,N',N'-tetramethyl-hexanediamine-1,6,N,N,N',N',N''-pentamethyl-diethylenetriamine, bis-(2-dimethylaminoethoxy)-methane, N,N,N'-trimethyl-N'-(2-hydroxyethyl)ethylenediamine, N,N-dimethyl-N',N'-(2-hydroxyethyl)-ethylenediamine, tetramethylguanidine, N-methylpiperidine, N-ethylpiperidine, N-methylmorpholine, N-ethylmorpholine, 1,4-dimethylpiperidine, 1,2,4-trimethylpiperidine, N-(2-dimethylaminoethyl)morpholine, 1-methyl-4-(2-dimethylamino)-piperidine, 1,4-diazabicyclo[2.2.2]octane, 2-methyl-1,4-azabicyclo[2.2.2]octane quinuclidine, 1,5-diazabicyclo[5.4.0]-5-undecene and 1,5-diazabicyclo[4.3.0]-5-nonane. Aromatic tertiary amines include dimethylaniline, diethylaniline, dimethylbenzylamine, pyridine, picoline and quinoline.

Other suitable amine catalysts include ammonia or an aliphatic primary or secondary amine such as ethylamine, propylamine, butylamine, octylamine, cyclohexylamine, benzylamine, diethylamine, dibutylamine, dicyclohexylamine, dibenzylamine, piperidine, N-methylpiperazine and morpholine, and aromatic primary or secondary amines such as aniline, N-methylaniline and naphthylamine. Because these amines contain isocyanate-reactive groups, they are less preferred.

The concentration of the amine present in the gaseous phase is about 10 to 100,000 ppm, preferably about 100 to 20,000 ppm. The treatment temperature may be about 0° to 100° C., preferably about 10° to 50° C., and more preferably about room temperature. The treatment time may vary depending upon the composition of the resin, temperature, thickness of the film and type and concentration of the amine, but is generally about 1 to 10 minutes.

The amine present in the gaseous phase includes not only amines present in the vapor phase, but also amines dispersed or maintained as fine particles in other gaseous phases. For example, it may be present in the form of a spray, aerosol or mist. In addition, the amine may be present as fine particles either dissolved in or carried by another substance. The amine may be in admixture with a carrier gas such as air; however, inert gases such as carbon dioxide or nitrogen which do not affect the activity of the amine catalyst are preferably used.

Details regarding suitable apparatus for conducting the amine vapor process are disclosed in U.S. Pat. Nos. 3,851,402 and 3,931,684, which are herein incorporated by reference in their entireties.

Additives, such as other catalysts, fillers, pigments, dyes and levelling aids, may be added as required to the compositions of the present invention.

The invention is further illustrated but is not intended to be limited by the following examples in which all parts and percentages are by weight unless otherwise specified.

EXAMPLES

Polyisocyanate I—A trimerization product of 1,6-hexamethylene diisocyanate (HDI) present as a 90% solids solution in a 1:1 mixture of n-butyl acetate and solvent naphtha 100, available as Desmodur N 3390 from Mobay Corporation.

Acidified Polyisocyanate II—An acidified aliphatic polyisocyanate solution was prepared by bubbling anhydrous hydrogen chloride (HCl) gas through 1871.5 parts of Polyisocyanate I with stirring. The gas was bubbled through the stirred solution of the polyisocyanate at 25° C. for approximately 1 hour resulting in an increase of 1.2 parts in the total weight of the solution.

Polyisocyanate I, Acidified Polyisocyanate II and a sample of HDI (for comparison) were analyzed by known methods for total chlorine (TC,%), acid chloride chlorine (AcCl,%), hydrolyzable chloride (HC,%), and isocyanate content (NCO,%).

| Polyisocyanate | TC, % | AcCl, % | HC, % | NCO, % |
| --- | --- | --- | --- | --- |
| Acidified Polyisocyanate II | 0.190 | 0.100 | 0.097 | 19.5 |
| Desmodur N-3390 | 0.058 | 0.0035 | 0.0026 | 19.5 |
| HDI | 0.096 | 0.028 | 0.027 | — |

The color of Acidified Polyisocyanate II turned from slightly yellow to slightly green after one week storage at room temperature.

EXAMPLES 1–5

These examples illustrate the effect that the addition of HCl to a polyisocyanate has on the viscosity build-up and curing times of a reactive, catalyzed two component polyurethane acrylic coating composition. The hydroxy-functional acrylic resin had an approximate molecular weight of 45,000, was present as a 50% solution in a 1:1 mixture of n-butyl acetate and xylene and was based on 1 part of acrylic acid, 14 parts of 2-ethylhexyl acrylate, 16 parts of 2-hydroxylethyl methacrylate and 69 parts of methyl methacrylate. Catalyzed solutions were prepared by further diluting 85 parts of the hydroxy functional acrylic resin with 35.2 parts of a 1:1 mixture of n-butyl acetate and xylene and then blending the resulting mixture with 11.3 parts of the polyisocyanates set forth below and 0.2%, based on the weight of the reactants, of dimethyltin dichloride. The coating compositions had an equivalent ratio of isocyanate to hydroxyl groups of 1.05 and a solids content of 40%. The viscosities of the materials were measured within 5 minutes after mixing and then periodically until the materials gelled; all measurements were at 25° C., which was also the storage temperature of the mixtures. The results are summarized in Table I. The following polyisocyanates and polyisocyanate blends were used in the examples:

Example 1—Polyisocyanate I
Example 2—Acidified Polyisocyanate II
Example 3—75% Acidified Polyisocyanate II and 25% Polyisocyanate I
Example 4—50% Acidified Polyisocyanate II and 50% Polyisocyanate I
Example 5—25% Acidified Polyisocyanate II and 75% Polyisocyanate I

TABLE I

Effect of HCl on catalyzed two component polyurethane coatings.

| | Example Number | | | | |
|---|---|---|---|---|---|
| | 1 | 2 | 3 | 4 | 5 |
| Viscosity (mPa·sec) after | | | | | |
| 5 min | 140 | 140 | 145 | 120 | 125 |
| 15 min | 170 | 160 | 165 | 140 | 140 |
| 30 min | 190 | 175 | 175 | 145 | 145 |
| 60 min | 290 | 190 | 185 | 150 | 155 |
| 90 min | 660 | 200 | 195 | 160 | 160 |
| 120 min | >100,000 | 210 | 210 | 170 | 180 |
| 150 min | gel | 220 | 230 | 180 | 225 |
| 180 min | — | 230 | 240 | 195 | 320 |
| 210 min | — | 250 | 250 | 225 | 520 |
| 240 min | — | 270 | 260 | 270 | 1,500 |
| 270 min | — | 280 | — | 365 | gel |
| 300 min | — | 295 | 300 | 540 | — |
| 330 min | — | 320 | 320 | 4,000 | — |
| 360 min | — | 345 | 345 | >100,000 | — |
| 390 min | — | — | 410 | gel | — |
| 420 min | — | — | 520 | — | — |
| 540 min | — | >100,000 | gel | — | — |
| 570 min | — | gel | — | — | — |
| Curing Times (min at 25° C.) | | | | | |
| set to touch | 10 | 15 | 10 | 15 | 15 |
| surface dry | 15 | 20 | 15 | 20 | 20 |
| hard dry | 120 | 150 | 60 | 90 | 60 |
| Ratio (moles HCl/moles catalyst)[a] | 0.15 | 6 | 4.5 | 3 | 1.5 |

[a]Calculated based on HC, % as HCl.

These examples demonstrate that the addition of HCl to the catalyzed, two component systems increases the potlife and gel time of the system without significantly lengthening the curing time of the coating.

EXAMPLES 6-9

These examples illustrate the effect that the presence of amine vapors have on the curing times of a reactive, catalyzed two component polyurethane acrylic coating composition with increased potlife as prepared in accordance with the present invention. Catalyzed solutions were prepared by further diluting 85 parts of the hydroxy functional acrylic resin used in Examples 1-5 with 35.2 parts of a 1:1 mixture of n-butyl acetate and xylene and then blending with 11.3 parts of the polyisocyanates and 0.04%, based on the weight of the reactants, of the catalysts set forth below. The coating compositions had a ratio of isocyanate to hydroxyl groups of 1.05 and a solids content of 40%. The catalyst was either dimethyltin dichloride (DMTDC) or dibutyltin dilaurate (DBTDL). The viscosity was again monitored at 25° C. The coatings were cured under ambient conditions or in a desiccator containing a saturated vapor of triethylamine.

The following polyisocyanates and catalysts were used in the examples:
Example 6—Polyisocyanate I and DMTDC.
Example 7—Acidified Polyisocyanate II and DMTDC.
Example 8—Polyisocyanate I and DBTDL.
Example 9—Acidified Polyisocyanate II and DBTDL.

TABLE II

Effect of amine vapor on curing two component polyurethane coatings.

| | Example Number | | | |
|---|---|---|---|---|
| | 6 | 7 | 8 | 9 |
| Viscosity (mPa·sec) after | | | | |
| 5 min | 130 | 130 | 130 | 145 |
| 15 min | 150 | 145 | — | 165 |
| 30 min | 185 | 160 | — | 175 |
| 60 min | 560 | 170 | 200 | 190 |
| 90 min | gel | 185 | 235 | 195 |
| 120 min | — | 195 | 270 | 200 |
| 150 min | — | 205 | 305 | 205 |
| 180 min | — | 220 | 400 | 220 |
| 210 min | — | 235 | 560 | — |
| 240 min | — | 255 | 940 | 265 |
| 300 min | — | 700 | >100,000 | 355 |
| 330 min | — | 14,000 | gel | — |
| 360 min | — | gel | — | 500 |
| 540 min | — | — | — | gel |
| Curing Times (min at 25° C.) without amine | | | | |
| set to touch | 10 | 8 | 8 | 5 |
| surface dry | 15 | 13 | 15 | 10 |
| hard dry | 30 | 65 | 40 | 90 |
| with amine | | | | |
| set to touch | — | 10 | 10 | — |
| surface dry | — | 15 | 15 | — |
| hard dry | — | 30 | 20 | — |
| Ratio (moles HCl/moles catalyst)[a] | 0.07 | 3 | 0.22 | 8 |

[a]Calculated based on HC, % as HCl.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a polyurethane coating which comprises
   a) preparing a coating composition having an improved potlife comprising
      i) a compound containing at least two hydroxyl groups,
      ii) a polyisocyanate adduct containing aliphatically-, cycloaliphatically- or araliphatically-bound isocyanate groups,
      iii) about 0.005 to 2.0 weight percent, based on the weight of components i) and ii), of a tin catalyst and
      iv) at least about 50 mole percent, based on the tin catalyst, of hydrogen chloride,
   b) applying said coating composition to a substrate and
   c) curing said coating composition to form said polyurethane coating.

2. The process of claim 1 wherein said polyisocyanate adduct contains isocyanurate or biuret groups and is prepared from 1,6-hexamethylene diisocyanate.

3. The process of claim 1 wherein said reaction mixture is cured in the presence of an amine vapor.

4. The process of claim 3 which comprises applying said coating composition by spraying and injecting said amine vapor into said coating composition before spraying.

5. A process for the preparation of a polyurethane coating which comprises
   a) preparing a coating composition having an improved potlife comprising
      i) a polyhydroxy polyacrylate,
      ii) a polyisocyanate adduct containing aliphatically-, cycloaliphatically- or araliphatically-bound isocyanate groups,
      iii) about 0.02 to 0.5 weight percent, based on the weight of components i) and ii), of a tin catalyst and
      iv) about 100 to 1000 mole percent, based on the tin catalyst, of hydrogen chloride,
   b) applying said coating composition to a substrate and
   c) curing said coating composition to form the polyurethane coating.

6. The process of claim 5 wherein said polyisocyanate adduct contains isocyanurate or biuret groups and is prepared from 1,6-hexamethylene disocyanate.

7. The process of claim 5 wherein said catalyst is dimethyl tin dichloride.

8. The process of claim 5 wherein said reaction mixture is cured in the presence of an amine vapor.

9. The process of claim 6 wherein said reaction mixture is cured in the presence of an amine vapor.

10. The process of claim 8 which comprises applying said coating composition by spraying and injecting said amine vapor into said coating composition before spraying.

11. The process of claim 9 which comprises applying said coating composition by spraying and injecting said amine vapor into said coating composition before spraying.

* * * * *